United States Patent
Hogan

(10) Patent No.: US 6,904,492 B2
(45) Date of Patent: Jun. 7, 2005

(54) WRITE-ONCE MEMORY DEVICE INCLUDING NON-VOLATILE MEMORY FOR TEMPORARY STORAGE

(75) Inventor: Josh N. Hogan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/025,306

(22) Filed: Dec. 19, 2001

(65) Prior Publication Data

US 2003/0115404 A1 Jun. 19, 2003

(51) Int. Cl.⁷ .............................................. G06F 12/00
(52) U.S. Cl. ...................... 711/102; 711/154; 711/103; 711/165; 365/175; 365/63
(58) Field of Search ................. 711/102, 154, 711/103, 165; 365/175, 63, 225.7, 96; 714/48, 768

(56) References Cited

U.S. PATENT DOCUMENTS

| 5,646,879 | A | * | 7/1997 | Harshfield | ................... 365/105 |
| 6,343,341 | B1 | * | 1/2002 | Cabrera et al. | ............. 711/111 |
| 6,621,425 | B2 | * | 9/2003 | Maeda | ........................ 341/50 |
| 6,684,289 | B1 | * | 1/2004 | Gonzalez et al. | ........... 711/103 |
| 2003/0145154 | A1 | * | 7/2003 | Barnett et al. | ............... 711/103 |

FOREIGN PATENT DOCUMENTS

| EP | 0969480 | 1/2000 |
| EP | 1089275 | 4/2001 |
| WO | WO0193035 | 12/2001 |

* cited by examiner

Primary Examiner—Donald Sparks
Assistant Examiner—Brian R. Peugh

(57) ABSTRACT

A memory device includes write-once memory; non-volatile memory; and a circuit for writing user data to the write-once memory and at least one of user data and error correction data to the non-volatile memory.

25 Claims, 5 Drawing Sheets

WRITE-ONCE MEMORY DEVICE INCLUDING NON-VOLATILE MEMORY FOR TEMPORARY STORAGE

BACKGROUND

Portable devices such as PDAs, handheld computers, digital cameras and digital music players include memory for storing data, digital images and MP3 files. Different types of memory are available for these portable devices. Conventional memory types include flash memory, mini-hard drives, mini-compact discs, and magnetic tape. However, each of these memory types has one or more of the following limitations: large physical size, low storage capacity, relatively high cost, poor robustness, slow access time and high power consumption.

Solid state diode-based one-time programmable (OTP) memory is disclosed in assignee's U.S. Ser. No. 09/875,356 filed Jun. 5, 2001. Compared to the conventional memory, the diode-based memory has a high shock tolerance, low power consumption, fast access time, moderate transfer rate, and good storage capacity. The diode-based memory can fit into a standard portable interface (e.g., PCMCIA, CF) of a portable device.

User data is written to the OTP memory in blocks. Before the blocks are written to the OTP memory, however, error correction data such as ECC code words are added. Errors can occur due to defects in the storage medium and noise in the read channels. If errors occur in the user data, the error correction data allows the errors to be corrected.

To calculate the error correction data, a full block is needed. A typical block size is 32 kilobytes.

The block size is always the same. However, data file sizes of less than one kilobyte are not uncommon. If only a few bytes of user data are to be written to the OTP memory, padding (i.e., extra bytes) may be added to the user data to reach the 32 KByte block size. Once full block size has been reached, the error correction data is generated.

Memory is wasted if the user data is padded. A more efficient approach is needed, especially where large numbers of small files are involved.

SUMMARY

According to one aspect of the present invention, a data storage device includes write-once memory; non-volatile memory; and a circuit for writing user data to the write-once memory and at least one of the user data and error correction data to the non-volatile memory. Other aspects and advantages of the present invention will become apparent from the following detailed description, taken in conjunction with the accompanying drawings, illustrating by way of example the principles of the present invention.

DETAILED DESCRIPTION

Figure 1:
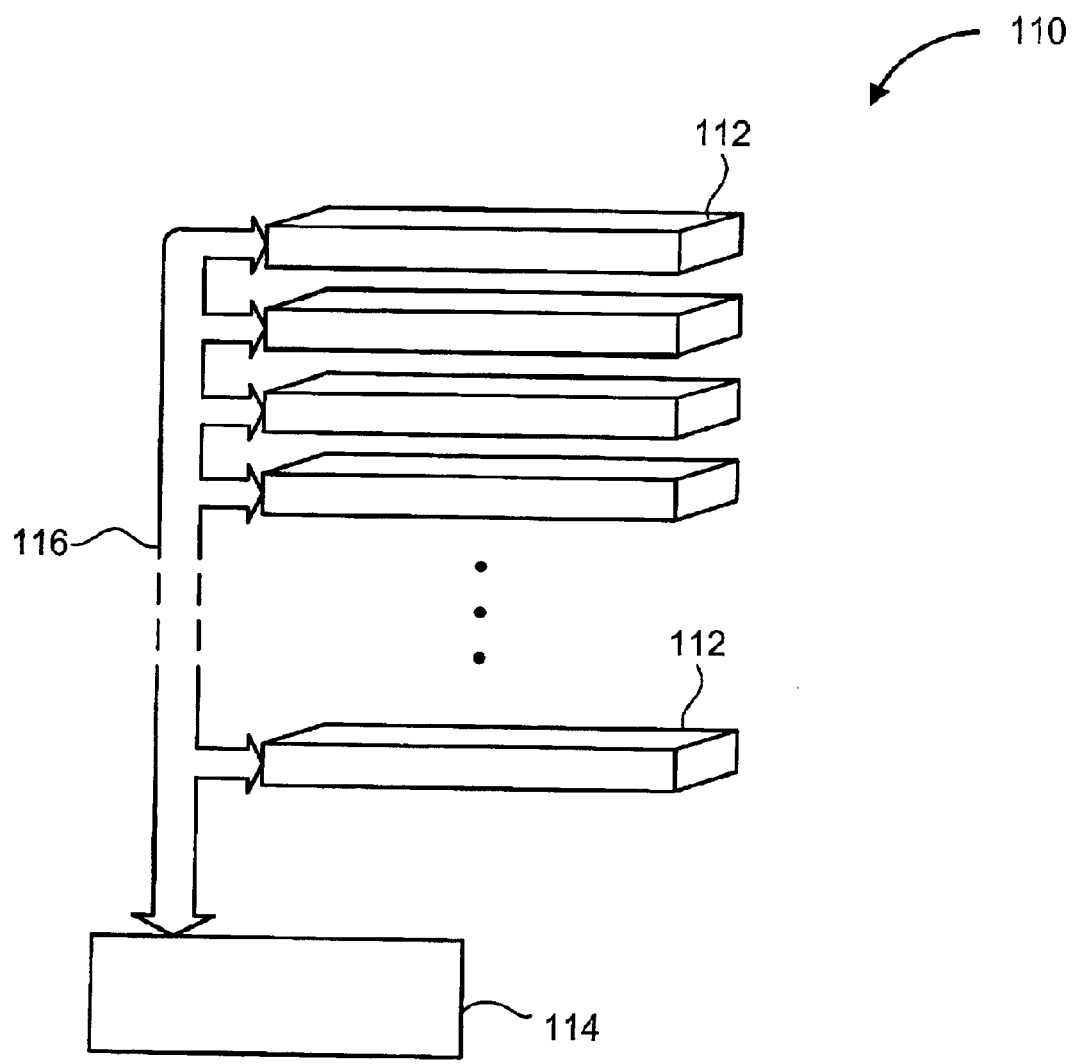
FIG. 1 is an illustration of a multi-level solid state OTP memory device.

As shown in the drawings for the purpose of illustration, the present invention is embodied in a solid state OTP memory device. The memory device can store small files to write-once memory, while preserving error correction capability, but without adding significant padding. Consequently, write-once memory is used more efficiently, especially where large numbers of small files are involved. Moreover, conventional error correction algorithms may be used.

Figure 2:
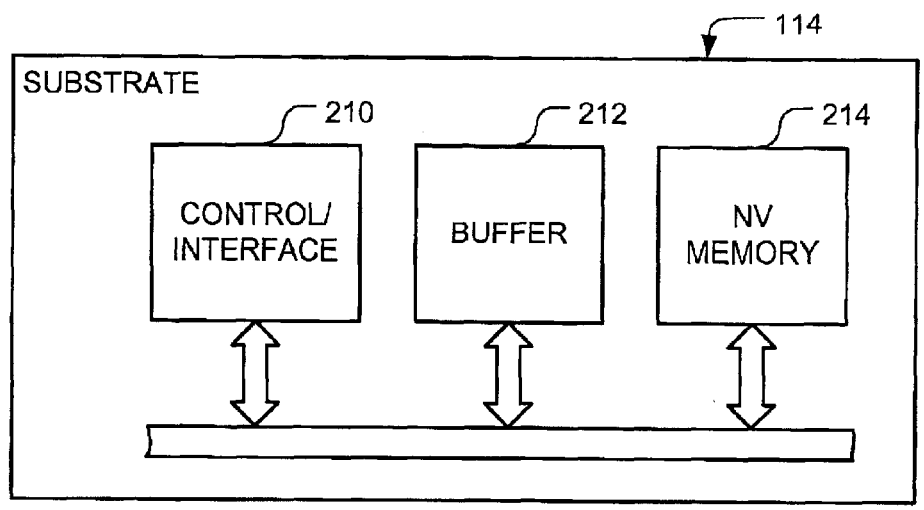
FIG. 2 is an illustration of memory and circuitry formed in a substrate of the memory device.

Reference is made to FIGS. 1 and 2. A multi-level solid state memory device 110 includes a stack of levels 112 of write-once memory. The stack is formed on a substrate 114. Each level 112 includes main memory and address logic. Details of an exemplary level 112 are disclosed in assignee's U.S. Ser. No. 09/911,974 filed Jul. 24, 2001 (now U.S. Pat. No. 6,535,418) and incorporated herein by reference.

Control/interface circuitry 210 and a data buffer 212 are formed in the substrate 114. The control/interface circuitry 210 performs functions for operating the device 110. These functions include setting write voltages, setting write enable lines and controlling power sense striping, memory addressing by converting logical addresses to address line patterns required to access physical memory locations, and data read processing of sense line outputs.

The levels 112 are connected to the control/interface circuitry 210 by a memory system interface 116. The system interface 116 includes address lines. Address logic on each level 112 shares the same address lines. When a word is written to the write-once memory, the bits of the word are not stored in contiguous memory elements. Instead, the bits are stored on different levels 112.

The control/interface circuitry 210 assembles user data into user data blocks (in the data buffer 212), generates error correction data (e.g., error code correction or "ECC" code words), and writes the user data and error correction data to the write-once memory as described below.

The substrate 114 also contains a small amount of non-volatile memory 214 (e.g., flash memory) for storing at least one of user data and the error correction data. The size (i.e., storage capacity) of the non-volatile memory 214 will depend upon how incomplete blocks of user data are handled, as will be described below. Typically, storage capacity of the non-volatile memory 214 will not exceed the size of a user data block (e.g., 32 KBytes).

Figure 3:
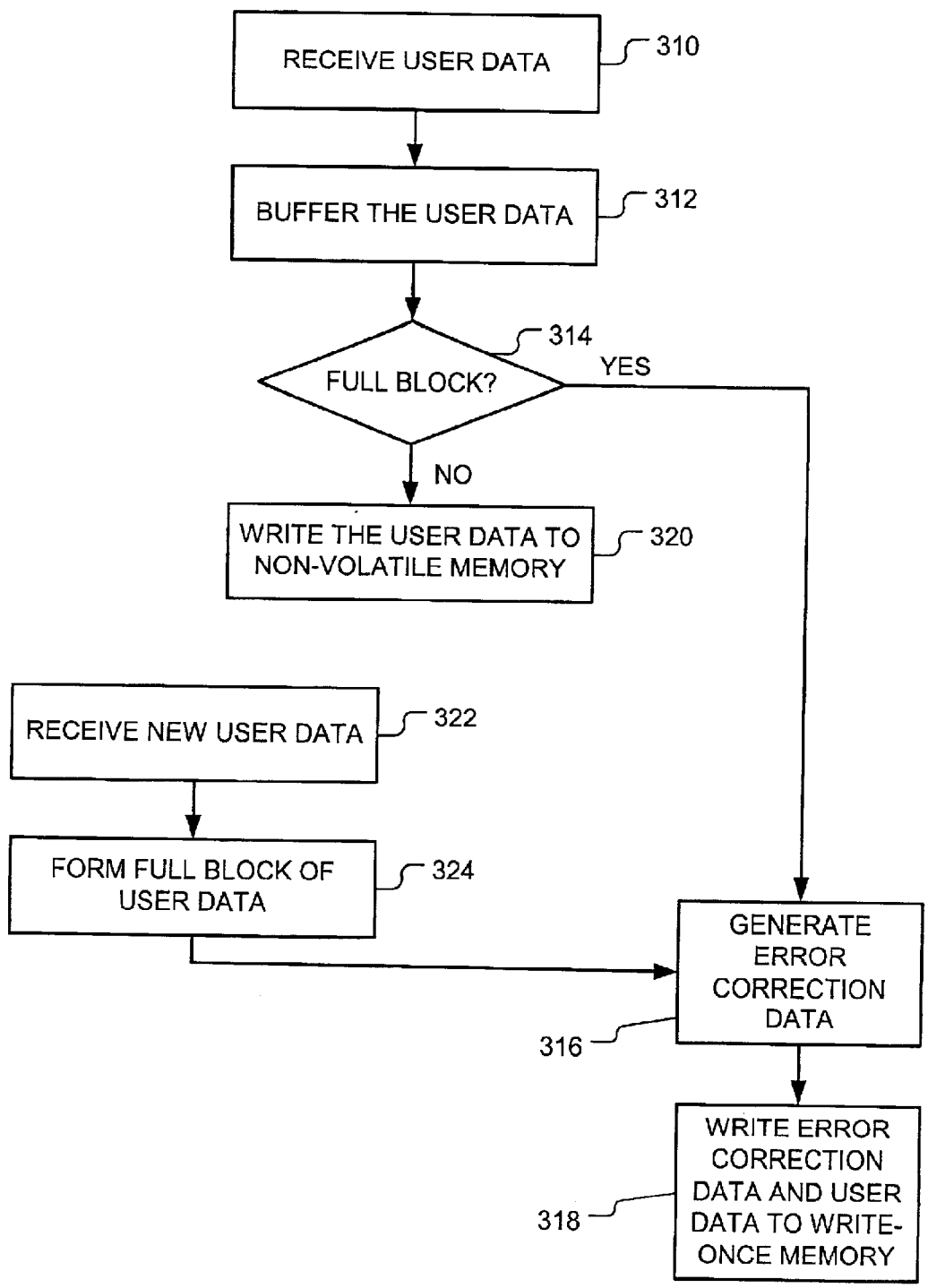
FIG. 3 is an illustration of a first method of writing a block of data to the memory device.

Additional reference is made to FIG. 3, which illustrates a first method, performed by the control/interface circuitry 210, for writing user data to the write-once memory. The control/interface circuitry 210 receives user data (e.g., from a host) (310) and buffers the user data in the buffer 212 (312). The control interface circuitry 210 determines whether the buffered user data forms a full block (314). If the buffered user data forms a full block, the control/interface circuitry 210 generates error correction data (316), and writes the user data and the error correction data to the write-once memory (318).

If the block of user data is incomplete (that is, not enough user data is present to make a full block) (314), the control/interface circuitry 210 writes the user data to the non-volatile memory 214 (320).

When the control/interface circuitry 210 receives new user data, it moves the user data from the non-volatile memory 214 to the buffer 212, and adds the new user data until a full block is formed (324). Once a full block is formed, error correction data is generated for the full block (316), and the user data and the error correction data are written to the write-once memory (318).

A variety of encoding methods are available for generating the error correction data. For example, Reed-Solomon Product Code ("RS-PC") encoding may be used. An RS-PC block and an alternative method for writing to an OTP device will now be described. The alternative method will be described in connection with RS-PC encoding.

Figure 4:
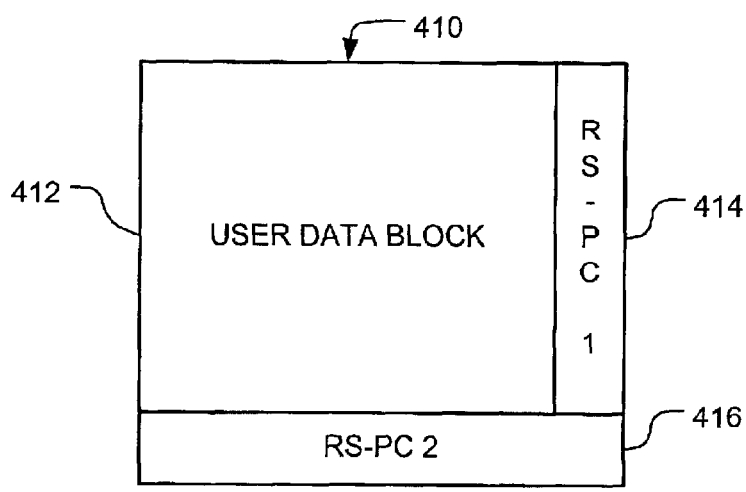
FIG. 4 is an illustration of an RS-PC block.

Reference is now made to FIG. 4, which shows an RS-PC block 410. A total of sixteen 2 KByte sectors are arranged into a 32 KByte block of user data 412. RS-PC encoding is performed on each 32 KByte block of user data. The RS-PC encoding is two-dimensional. An RS-PC code word for a row may be computed after the row is filled, and the code word is appended to the end of that row. The last column 414 of the RS-PC block 410 contains these "first level" code words. After all rows of user data (and their code words) have been filled, RS-PC code words for the columns are generated, and appended to the end of the columns. The last row 416 of the RS-PC block 410 includes these "second level" code words.

Figure 5A:
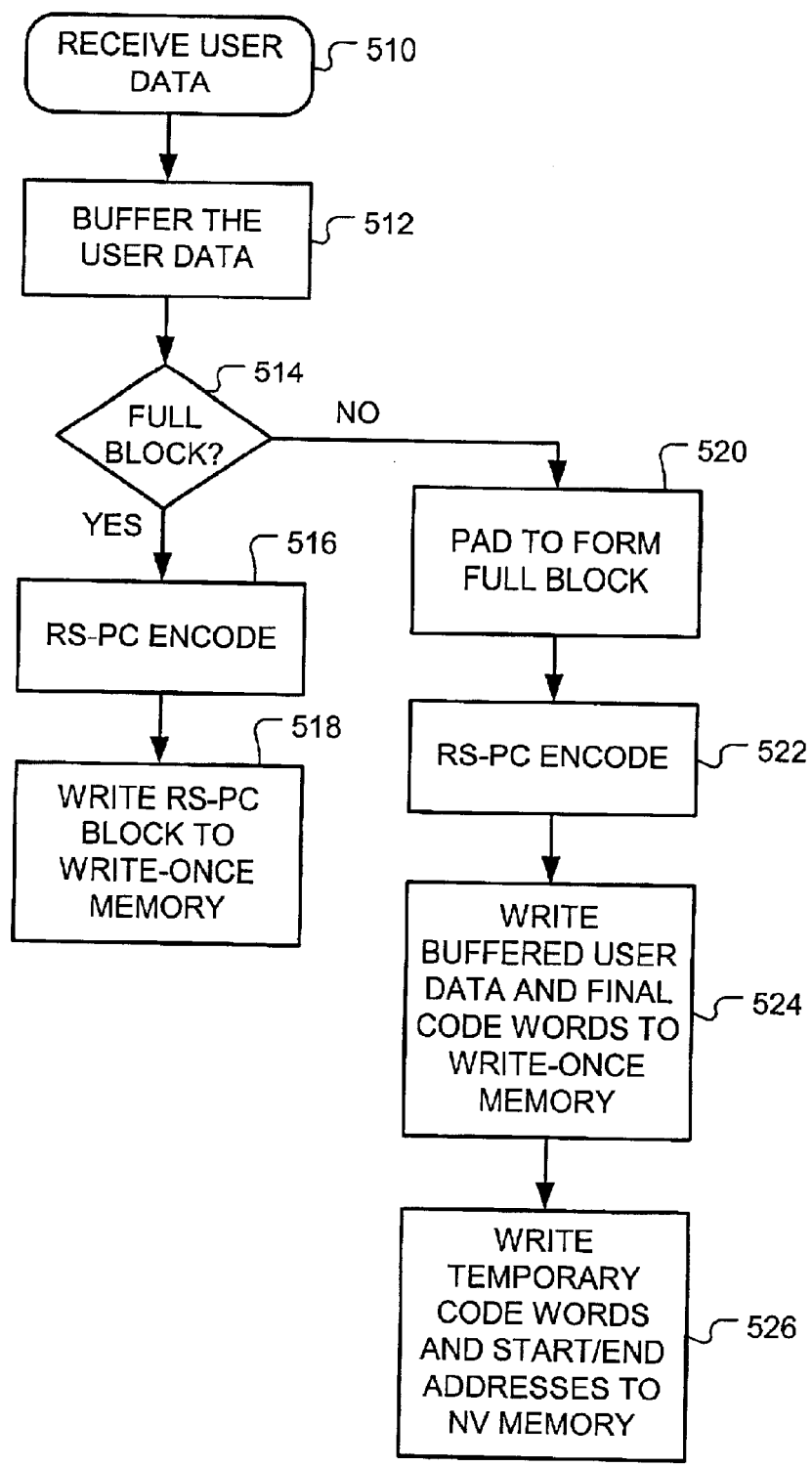
FIGS. 5a and 5b are illustrations of a second method of writing a block of data to the memory device.
Figure 5B:
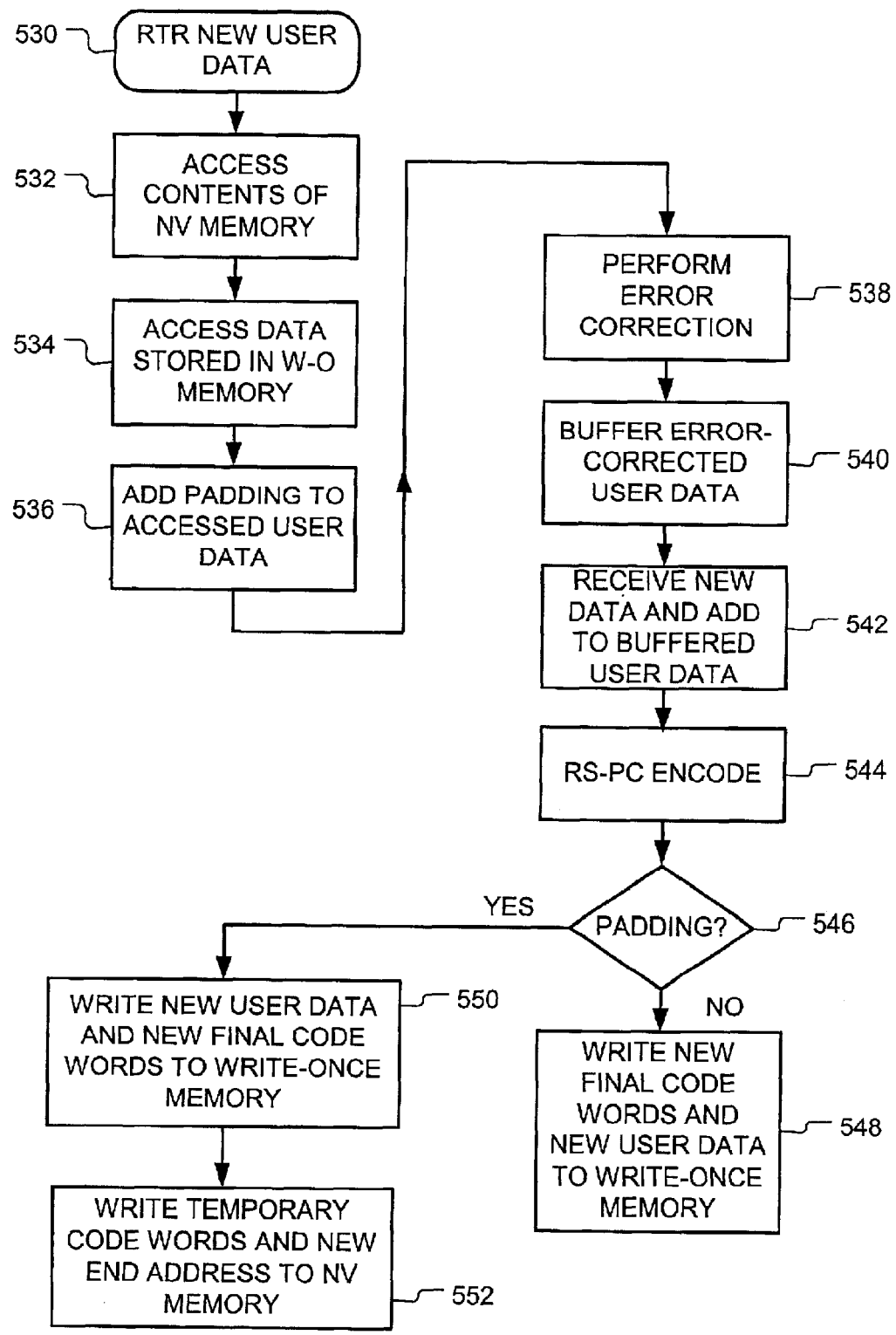

Reference is now made to FIGS. 5a and 5b, which show an alternative write method performed by the interface/control circuitry 210. The interface/control circuitry 210 receives user data (510) and writes the user data to the buffer 212 (512). If the buffered user data forms a full block (514), the control/interface circuitry 210 performs RS-PC encoding on the full block (516), and writes the resulting RS-PC block to the write-once memory (518).

If the buffered user data does not form a full block (514), padding (e.g., 0's) is added to the buffered user data to form a full block (520), and RS-PC encoding is performed on the padded block (522). The buffered user data and final code words are written to the write-once memory (524). The final code words in this example would be those first level RS-PC code words at the end of complete lines of user data.

The data just written to the write-once memory is stored between starting and ending addresses in the write-once memory. Those starting and ending addresses are written to the non-volatile memory 214 (526). Further, temporary RS-PC code words are written to the non-volatile memory 214 (526). The temporary code words in this example would be all second level RS-PC code words and those first level RS-PC code words at the end of incomplete lines of user data.

When new user data is ready to be received (block 530), the starting and ending addresses and the temporary RS-PC code words are accessed from the non-volatile memory 214 (532), user data and final code words between the starting and ending addresses is accessed from the write-once memory (534), the same padding is added to the accessed user data to form a full block (536), and the full block is error corrected using the accessed RS-PC code words (538). The error-corrected user data (but not the padding or the code words) is stored in the data buffer 212 (540).

The new data is received and overwrites the padding (542), and RS-PC encoding is performed (544). If all of the padding has been overwritten (546), the new final code words and the new user data are written to the write-once memory (548).

If all of the padding has not been overwritten (546), the user data that overwrote the padding and the new final code words are stored in write-once memory (550). In addition, new temporary code words and the new end address are written to the non-volatile memory 214 (552).

The method of FIGS. 5a and 5b is not limited to RS-PC blocks. It may be used in connection with any error correction scheme.

The method of FIGS. 5a and 5b may be modified as follows. As one example, all code words (temporary and final) are written to the nonvolatile memory.

As another example, only complete rows of user data and their corresponding final code words are written to the write-only memory. Incomplete rows of user data are written to the non-volatile memory 214, along with the starting/ending addresses and the temporary code words. Before additional data is received, the user data and the final code words are retrieved from the write-once memory, the incomplete row and temporary code words are retrieved from the non-volatile memory, the padding is added, and error correction is performed.

Although the memory device was described in connection with solid state OTP memory, it is not so limited. The memory device may be any data storage device that includes write-once memory, a small amount of nonvolatile memory, and a circuit for writing user data to the write-once memory and storing in the non-volatile memory at least one of user data and error correction data.

The present invention is not limited to the specific embodiments described and illustrated above. Instead, the present invention is construed according to the claims that follow.

What is claimed is:

1. A data storage device comprising write-once memory; non-volatile memory; and a circuit; wherein the circuit stores an incomplete block of user data in the non-volatile memory and uses the stored user data to form a full block when new user data is received; and wherein the circuit generates error correction data for the full block, and writes the full block of user data and the error correction data to the write-once memory.

2. A data storage device comprising write-once memory; non-volatile memory; and a circuit for writing an incomplete block of user data to the write-once memory, generating error correction data for a full block including the user data and padding, and storing at least some of the error correction data in the non-volatile memory.

3. The device of claim 2, wherein final error correction data is written to the write-once memory and temporary error correction data is written to the non-volatile memory.

4. The device of claim 2, wherein the incomplete block of user data is written between starting and ending addresses in the write-once memory; and wherein the circuit also writes the ending address to the non-volatile memory.

5. The device of claim 2, wherein the circuit accesses the incomplete block from the write-once memory, pads the incomplete block, accesses the error correction data, and uses the error correction data to perform error correction on the padded block.

6. The device of claim 5, wherein the device receives new user data, and adds the new user data to the error-corrected user data.

7. The device of claim 2, wherein the error correction data includes RS-PC code words.

8. The device of claim 2, wherein the non-volatile memory is not large enough to store a single block of user data.

9. A data storage device comprising:
a substrate;
at least one level of solid state one-time programmable memory on the substrate;
non-volatile memory in the substrate; and
a circuit for writing user data to the write-once memory and using the user data to create error correction data, at least some of the error correction data stored in the non-volatile memory.

10. The device of claim 9, wherein the circuit writes an incomplete block of user data to the write-once memory, generates error correction data for a full block including the incomplete block and padding, and stores the error correction data in the non-volatile memory.

11. The device of claim 10, wherein final error correction data is written to the write-once memory and temporary error correction data is written to the non-volatile memory.

12. The device of claim 10, wherein the incomplete block of user data is written between starting and ending addresses in the write-once memory; and wherein the circuit also writes the ending address to the non-volatile memory.

13. The device of claim 10, wherein the circuit accesses the incomplete block from the write-once memory, accesses the error correction data from the non-volatile memory, pads the incomplete block, and uses the error correction data to perform error correction on the padded block.

14. The device of claim 13, wherein the device receives new user data, and adds the new user date to the error-corrected user data.

15. The device of claim 9, wherein the error correction data includes RS-PC code words.

16. Apparatus comprising:

write-once memory;

means for buffering an incomplete block of user data;

means for storing the incomplete block in the write-once memory;

means for adding padding to the incomplete block to form a padded block;

means for generating error correction data for the padded block; and means for storing at least some of the error correction data in the non-volatile memory.

17. Apparatus for a data storage device including write-once memory and non-volatile memory, the apparatus comprising a control circuit for writing an incomplete block of user data to the write-once memory, generating error correction data for a full block including the user data and padding, and storing at least some of the error correction data in the non-volatile memory.

18. The apparatus of claim 17, wherein final error correction data is written to the write-once memory and temporary error correction data is written to the non-volatile memory.

19. The apparatus of claim 17, wherein the incomplete block of user data is written between starting and ending addresses in the write-once memory; and wherein the circuit also writes the ending address to the non-volatile memory.

20. The apparatus of claim 17, wherein the circuit accesses the incomplete block from the write-once memory, accesses the error correction data, and uses the error correction data to perform error correction on the user data in the incomplete block.

21. The apparatus claim 20, wherein the circuit receives new user data, and adds the new user data to the error-corrected user data.

22. A method of writing to a device including non-volatile memory and write-once memory, the method comprising:

buffering an incomplete block of user data;

storing the incomplete block in the write-once memory;

adding padding to the incomplete block to form a padded block;

generating error correction data for the padded block; and storing at least some of the error correction data in the non-volatile memory.

23. The method of claim 22, wherein the incomplete block of user data is written between starting and ending addresses in the write-once memory; and wherein the method further comprises writing the ending address to the non-volatile memory.

24. The method of claim 22, further comprising:

accessing the incomplete block from the write-once memory;

accessing the error correction data;

padding the incomplete block; and using the error correction data to perform error correction on the padded block.

25. The method of claim 24, further comprising:

removing new user data;

adding the new user date to the error-corrected block to form a full incomplete block, generating new error correction data for the full block; and writing the new error correction data end the new user data to the write-once memory.

* * * * *